(No Model.)  3 Sheets—Sheet 1.

J. D. BOWLEY.
DEVICE FOR CARRYING OFF SMOKE AND STEAM FROM COOKING UTENSILS.

No. 347,564. Patented Aug. 17, 1886.

WITNESSES

James D. Bowley
INVENTOR
By Louis Bagger & Co.
Attorneys.

(No Model.)

J. D. BOWLEY.

DEVICE FOR CARRYING OFF SMOKE AND STEAM FROM COOKING UTENSILS.

No. 347,564.   Patented Aug. 17, 1886.

WITNESSES

INVENTOR
James D. Bowley
By Louis Bagger & Co.
Attorneys.

(No Model.) 3 Sheets—Sheet 3.
J. D. BOWLEY.
DEVICE FOR CARRYING OFF SMOKE AND STEAM FROM COOKING UTENSILS.
No. 347,564. Patented Aug. 17, 1886.
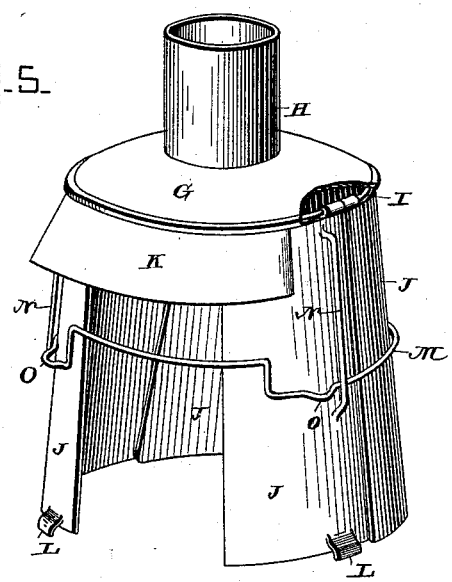
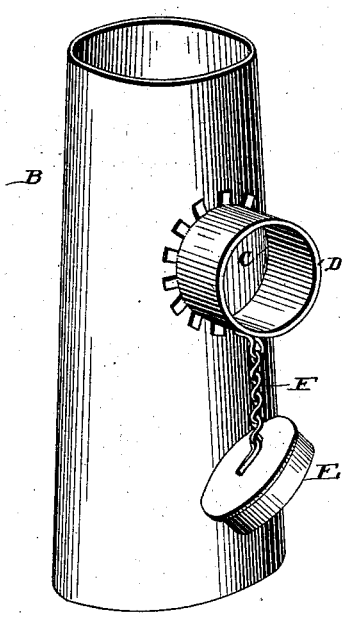
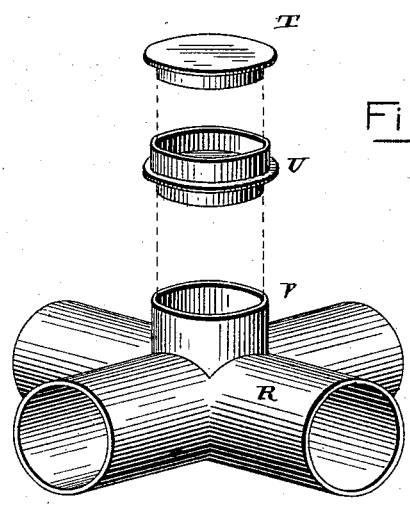
WITNESSES
C. H. Ourand
Edward Stanton
James D. Bowley
INVENTOR,
By Louis Bagger & Co.
Attorneys.

UNITED STATES PATENT OFFICE.

JAMES DEARNESS BOWLEY, OF BRANDON, MANITOBA, CANADA.

DEVICE FOR CARRYING OFF SMOKE AND STEAM FROM COOKING UTENSILS.

SPECIFICATION forming part of Letters Patent No. 347,564, dated August 17, 1886.

Application filed January 30, 1886. Serial No. 190,357. (No model.)

*To all whom it may concern:*

Be it known that I, JAMES DEARNESS BOWLEY, a subject of the Queen of Great Britain, and a resident of Brandon, in the Province of Manitoba and Dominion of Canada, have invented certain new and useful Improvements in Devices for Carrying off Smoke or Steam from Cooking Utensils; and I do hereby declare that the following is a full, clear, and exact description of the invention, which will enable others skilled in the art to which it appertains to make and use the same, reference being had to the accompanying drawings, which form a part of this specification, and in which—

Figure 1:
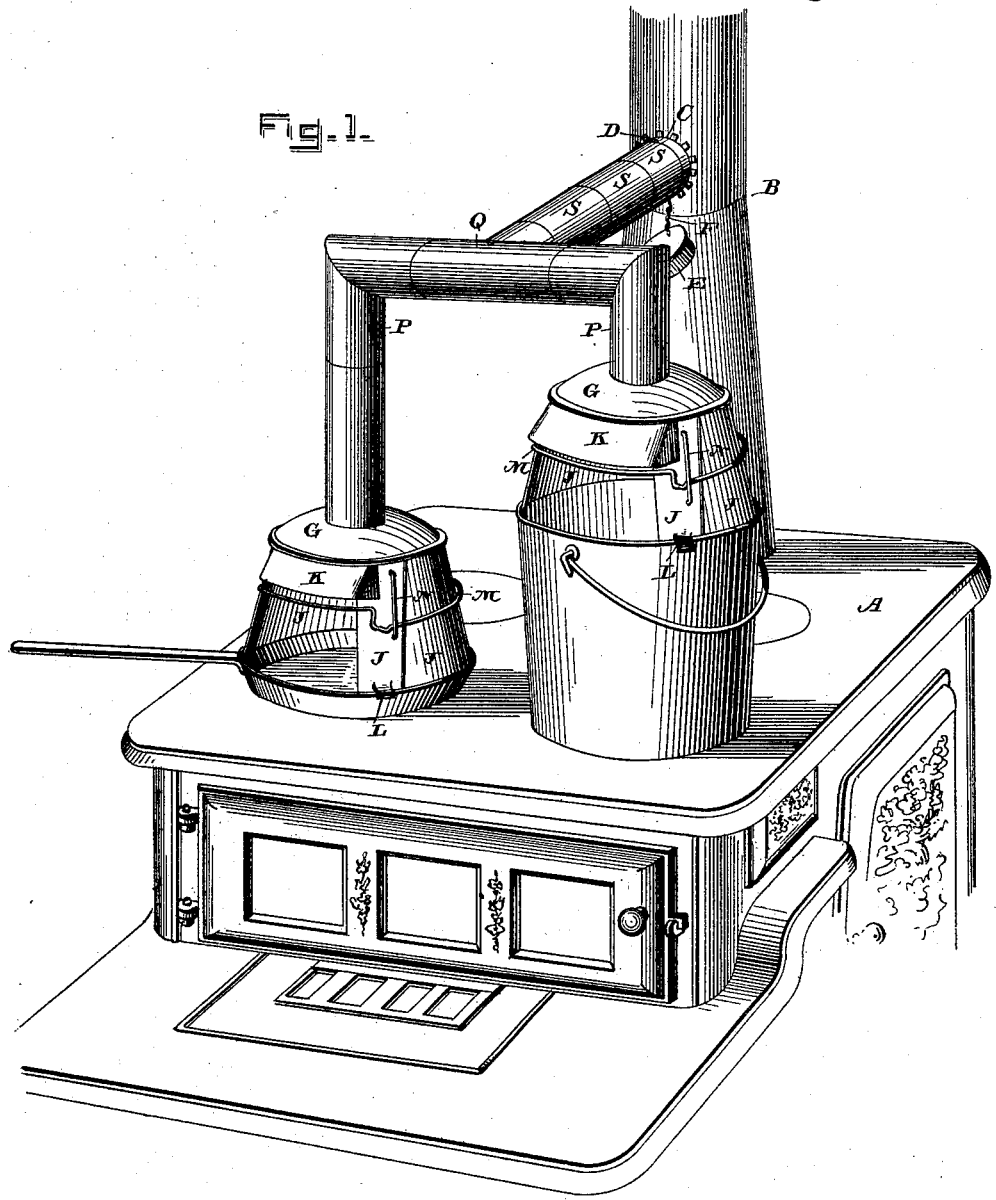
Figure 2:
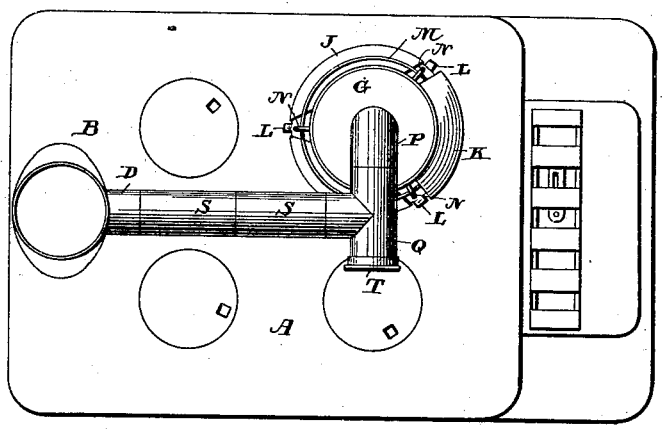
Figure 3:
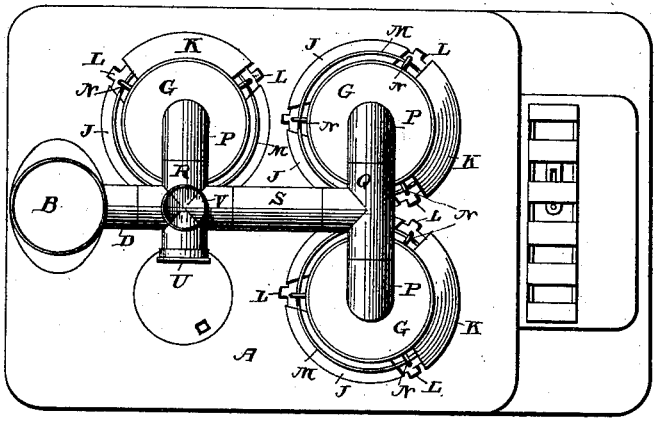
Figure 4:
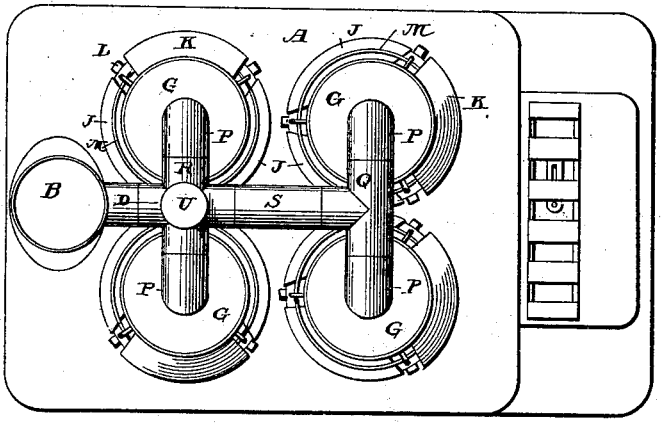

Figure 1 is a perspective view showing a stove provided with my improved device for carrying off smoke or steam from cooking utensils. Figs. 2, 3, and 4 are plan views of different forms of applying the device. Fig. 5 is a perspective detail view of the bell to be placed over the cooking-vessel, showing parts broken away. Fig. 6 is a perspective view of the collar and apertured portion of the stove-pipe with its cap; and Fig. 7 is a similar view of the joint for four pipes, showing the cap removed.

Similar letters of reference indicate corresponding parts in all the figures.

My invention has relation to that class of devices for conveying off smoke or steam from cooking utensils upon a stove in which a bell-shaped cap is placed over each vessel, and is provided with a pipe carrying off the smoke and steam, and entering the stove-pipe; and it consists in the improved construction and combination of parts of the same, as hereinafter more fully described and claimed.

In the accompanying drawings, the letter A indicates the stove, and B is the stove-pipe. This pipe has a round aperture, C, cut into its side at a suitable height above the top of the stove, and a collar, D, is secured to the edges of the aperture, projecting outward. A cap, E, fits into this collar, closing the aperture when the device is not in use, and is preferably secured to the pipe by means of a chain, F.

The device to be placed upon the utensils consists of a top, G, preferably circular, and slightly dished, and provided at its center with an upwardly-projecting pipe, H, and the top has a wire or rod, I, secured to its under side a short distance from its edge, and secured with a small space between it and the under side of the top. A number of rounded wings, J, are hinged with their upper narrower ends to the rod upon the top, forming the greater portion of a cone-surface, and the outer sides of the wider lower ends of some of these wings are provided with outwardly-projecting stops or lips L, which may rest upon the rims of the cooking-vessels upon which the device is used. A narrow deflecting-shield, K, is secured to the rim or edge of the top at the open side of the conical cap formed by the wings, and a ring, M, surrounds all the wings, and slides up and down upon the same, being confined by vertical bails N upon the outer sides of some of the wings, and this ring is provided with stops or bulged portions O, near the open side of the cap, against which stops the bails upon the wings flanking the open side may bear, preventing the wings from sliding upon the circular rod in the top so as to cover the open side and form apertures at other points. The pipe in the top of the cap is inserted into the downwardly-pointing branch of an elbow-joint, P, the horizontal branch of which is inserted into one branch of either a T-joint, Q, or a cross-joint or four-armed joint, R, according to the position of the vessel upon the stove over which the cap is placed. Lengths S of pipe are inserted into either of these joints, and into the collar in the stove-pipe.

When one vessel upon the stove is covered, the T-joint is connected with the stove-pipe by a suitable number of straight pipes, whereupon a cap, T, is used for covering one branch of the joint, while the elbow-joint is inserted into the other branch, as shown in Fig. 2.

When two vessels are covered by the caps, two elbow-joints are inserted into both ends of the T-joint, which is connected to the stove-pipe with pipes, as shown in Fig. 1; and if three, four, or a larger number of vessels are covered, and a corresponding number of caps are used, the T-joint is used at the vessels farthest away from the stove-pipe, while the cross-joint is used at the vessels nearest to the stove-pipe, having the straight pipes inserted into the longitudinal arms of this joint, and having the elbow-joints inserted into the transverse arms; and in case that one of the inner arms is not used the said arm is covered by a cap, U, which normally fits into a socket, V, upon the upper side of the cross-joint.

The device used for covering four vessels is shown in Fig. 4, and it follows that if the device is only used with three vessels, either one of the outer or one of the inner vessels being dispensed with, the corresponding arm or branch of the joint will be covered with a cap.

If a larger number of vessels are to be covered, the cross-joints are used for the vessels between the outermost pair of vessels and the stove-pipe, and it follows that any number of vessels may be covered by a sufficient number of caps connected by means of straight pipes and T-joints and cross-joints, which will carry the straight pipes in any direction.

The contents of the vessel may be inspected through the open side of the cap, and the cap may be distended or contracted by sliding the ring up or down upon the wings, fitting the cap to a vessel of any size.

Air will enter at the open side of the cap and will create a draft toward the stove-pipe, which will carry all the smoke, steam, or fumes from the article cooked in the vessel into the stove-pipe, and from that into the chimney, so that the apartment in which the cooking takes place may be kept perfectly free from all offensive odors or from smoke and steam.

The articles cooked in the vessels having the caps will be more perfectly cooked than articles cooked in open vessels, as the heat will not pass away so easily as from an open vessel, and the heat will be deflected from the tapering sides of the cap and thrown upon the articles cooked in the vessel, cooking the article more evenly and tenderer than in an open vessel.

The caps may be raised and lowered, according to the height of the cooking-vessel, by sliding the pipe in the top of the cap within the downwardly-pointing arm of the elbow-joint, and by sliding the several pipes and joints they may all be adjusted to suit the several positions of the cooking-vessels.

Having thus described my invention, I claim and desire to secure by Letters Patent of the United States—

1. In a device for conveying smoke or steam from cooking vessels, the combination of a top having a suitable pipe, a number of wings slightly curved, and having their narrower upper ends hinged to the under side of the top, and a ring bearing against the outer sides of the wings and sliding upon them, as and for the purpose shown and set forth.

2. In a device for conveying smoke or steam from cooking-vessels, the combination of a top having a suitable pipe, a number of wings slightly curved, and having their narrower upper ends hinged to the under side of the top and provided with vertical bails upon their outer sides, and a ring bearing against the outer sides of the wings sliding upon them within the bails, as and for the purpose shown and set forth.

3. In a device for conveying smoke or steam from cooking-vessels, the combination of a top having a suitable smoke-conveying pipe, a number of curved wings hinged at their upper narrower ends to the under side of the top, and having outwardly and downwardly projecting lips or stops at their lower ends, and a ring bearing against the outer sides of the wings and sliding upon them, as and for the purpose shown and set forth.

4. In a device for conveying smoke or steam from cooking-vessels, the combination of a top having a smoke-conveying pipe in its center, and having a wire or rod secured slightly below its under side a short distance from its edge, a number of curved wings having vertical bails upon their outer sides, and having stops or lips upon the lower ends, a ring sliding in the bails upon the wings and having stops upon it bearing against the bails of two of the wings, and a shield secured to the edge of the top at the open side of the bell formed by the wings, as and for the purpose shown and set forth.

5. In a device for conveying smoke and steam from cooking-vessels, the combination of a cross-joint or four-armed joint having a circular socket upon its upper side, with a cap fitting in either of the branches of the joint and in the socket upon the same, a pipe for connecting the same with the stove-pipe, and a series of elbow-joints, as and for the purpose shown and set forth.

In testimony that I claim the foregoing as my own I have hereunto affixed my signature in presence of two witnesses.

JAMES DEARNESS BOWLEY.

Witnesses:
W. R. BOWLEY,
T. MAYNE DALY.